(No Model.)
W. VOLTZ.
HOE OR RAKE.
No. 421,117.  Patented Feb. 11, 1890.
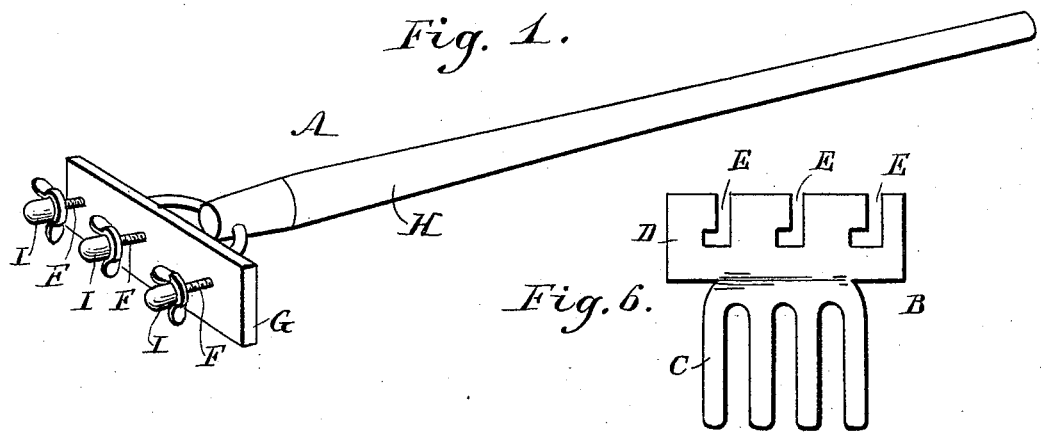
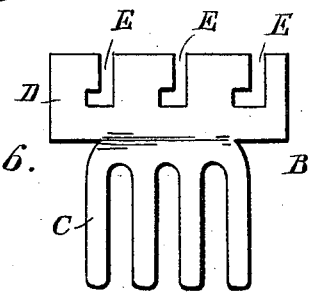
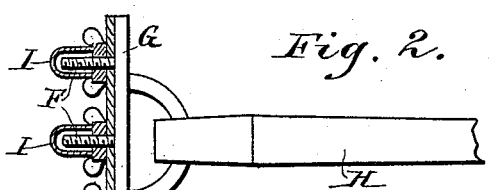
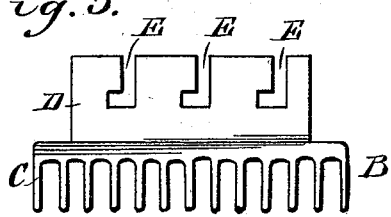
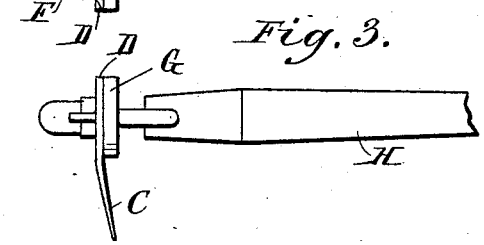
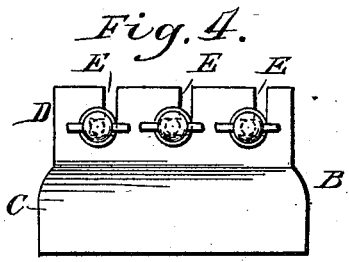
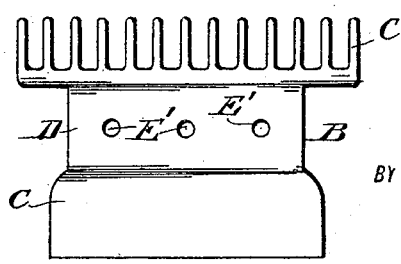
WITNESSES:  INVENTOR:
  W. Voltz
BY
  Munn & Co
ATTORNEYS.

UNITED STATES PATENT OFFICE.

WILLIAM VOLTZ, OF CHICAGO, ILLINOIS.

HOE OR RAKE.

SPECIFICATION forming part of Letters Patent No. 421,117, dated February 11, 1890.

Application filed August 16, 1889. Serial No. 321,015. (No model.)

*To all whom it may concern:*

Be it known that I, WILLIAM VOLTZ, of Chicago, in the county of Cook and State of Illinois, have invented a new and Improved Hoe or Rake, of which the following is a full, clear, and exact description.

The invention relates to farm, garden, and plantation implements in which the blades are secured by bolts to the handles.

The object of the invention is to provide a new and improved hoe or rake which is simple and durable in construction and permits a rigid and secure fastening of the blade to the handle.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of the handle of the implement. Fig. 2 is a sectional plan view of the improvement, showing the handle in full lines. Fig. 3 is a side elevation of the same. Fig. 4 is an end elevation of the same. Fig. 5 is a face view of the tool-blade as arranged for a rake. Fig. 6 is a like view of the tool-blade arranged as a potato-fork, and Fig. 7 is a face view of a double tool-blade.

The improved implement A is provided with a tool-blade B, having the hoe or rake part C made in suitable form, according to the use of the instrument, and as shown in Figs. 4, 5, 6, and 7. The tool-blade B is provided with a plate D, on which the hoe or rake part C is formed, and in the said plate D are arranged a series of L-shaped slots E, adapted to receive the bolts F, secured on a plate G, fastened on the lower end of the handle H. On the bolts F screw the nuts I.

The bolts F pass through the upper parts of the slots E until they reach the horizontal extensions of the slots, and then the nuts I are screwed up on the said bolts against the said plate D, whereby the latter is pressed against the plate G, and consequently securely fastened to the handle H. By this means the nuts are not entirely unscrewed when changing the blade. The hoe or rake part C of the blade B extends below the plates D and G, as is plainly shown in Fig. 3, so that the implement can be used in the same manner as ordinary rakes and hoes now in use.

The nuts I are preferably arranged as shown in Figs. 1 and 2—that is, each one is provided with a cap, into which passes the outer end of the respective bolt F, so that the latter is completely hidden from view, and grass, weeds, &c., are prevented from twisting around the said bolts.

As shown in Fig. 7, two hoe or rake parts C of different forms may be secured on one plate D, so that the implement can be used as a hoe and a rake combined, one part being used at a time. In this case the plate D is provided with apertures E' for the reception of the bolts F, and the nuts I must first be entirely unscrewed when attaching the blade to the handle.

Having thus described my invention, I claim as new and desire to secure by Letters Patent—

1. In a hoe or rake, the combination, with a tool-blade comprising a hoe or rake part and a plate made integral with the said hoe or rake part and provided with L-shaped slots, of a plate secured to a handle, bolts secured to the said plate and adapted to enter the slots of the blade, and nuts screwing on the said bolts against the said tool-blade, substantially as shown and described.

2. In a hoe or rake, the combination, with a tool-blade comprising a hoe or rake part and a plate made integral with the said hoe or rake part and provided with slots, of a plate secured to a handle, bolts secured to the plate and adapted to enter the slots of the blade, nuts screwing on the said bolts against the tool-blade, and caps formed on the said nuts to cover the outer ends of the said bolts, substantially as shown and described.

WILLIAM VOLTZ.

Witnesses:
JOHN A. VOLTZ,
WILLIAM MADLUNG.